United States Patent [19]

Stauffer et al.

[11] Patent Number: 5,256,717
[45] Date of Patent: Oct. 26, 1993

[54] HOT MELT ADHESIVES USEFUL IN TEMPORARY BONDING OPERATIONS

[75] Inventors: Daniel Stauffer, Kane, Pa.; Paul Puletti, Pittstown, N.J.

[73] Assignee: National Starch and Chemical Investment Holding Corporation, Wilmington, Del.

[21] Appl. No.: 630,461

[22] Filed: Dec. 19, 1990

[51] Int. Cl.$^5$ .............................................. C08K 5/10
[52] U.S. Cl. ................................... 524/293; 524/270; 524/277; 524/487; 524/489; 524/490
[58] Field of Search ............... 524/293, 270, 277, 487, 524/489, 490

[56] References Cited

U.S. PATENT DOCUMENTS 4,956,207  9/1990  Kaufman et al. ................... 428/34.2
5,026,756  6/1991  Arendt ................................ 524/293

FOREIGN PATENT DOCUMENTS

0410412A1  1/1991  European Pat. Off. .

Primary Examiner—Paul R. Michl
Assistant Examiner—Edward Cain
Attorney, Agent, or Firm—Eugene Zagarella, Jr.

[57] ABSTRACT

Hot melt adhesives having suitable open time and crystallinity properties making them especially useful as temporary adhesives are provided by a composition comprising a combination of 5 to 50% by weight of an isotactic thermoplastic polybutylene copolymer or a low density ethylene polymer with 3 to 65% by weight of a solid benzoate plasticizer.

19 Claims, No Drawings

HOT MELT ADHESIVES USEFUL IN TEMPORARY BONDING OPERATIONS

BACKGROUND OF THE INVENTION

This invention relates to hot melt adhesives comprising a blend of an isotactic thermoplastic polybutylene copolymer or a low density ethylene polymer with a solid benzoate plasticizer and a tackifier. Adhesives having this composition have been found to possess a unique combination of good open time and a delayed but increased crystalline character making them especially suitable as temporary adhesives for operations such as palletizing or those requiring a non-destructive bond.

Hot melt adhesives are bonding agents which achieve a solid state and resultant strength by cooling, as contrasted with other adhesives which set or harden by chemical reaction or loss of solvent or water vehicle. Prior to heating, the hot melt adhesive is a thermoplastic material in the form of a 100% by weight solid. Application of heat melts the adhesive so that it can be readily applied to the substrate desired. After removal of heat, the adhesive returns to the solid state by simple cooling.

Hot melt adhesives are widely used in industry for various applications including packaging, bookbinding, personal care products such as disposable diapers and sanitary napkins, and labeling. In order to satisfy the different property requirements in these and other applications, adhesive compositions are based on combinations of polymers and copolymers such as polyethylene, other polyolefins or mixtures, ethylene-vinyl acetate copolymers, polyamides, polyesters and block copolymers rubbers. Additives may also be included to modify and improve properties such as melt viscosity, peel strength, flexibility and stability and typical ones include waxes, oils, terpene resins, rosin derivatives, phenolic resins and coumarone-indene resins.

The isotactic polybutylene copolymers are known to be useful in hot melt adhesives because of desirable property attributes including long open time and their slow crystallization rate as noted in U.S. Pat. Nos. 4,568,713 and 4,956,207. However, such polybutylene copolymers and known adhesive compositions containing these copolymers do not possess the properties desired for a temporary adhesive of suitably long open time and very crystalline nature. These properties would provide a non-destructive, cohesively weak or break away bond that is needed in certainindustrial that is needed in certain industrial applications such as palletizing where articles, including cases and cartons, are placed on base pallets for temporary storage or transport.

SUMMARY OF THE INVENTION

Now it has been found that hot melt adhesives having a selected combination of an isotactic thermoplastic polybutylene copolymer or a low density ethylene polymer with a solid benzoate plasticizer and a tackifier possess suitable open time and crystallinity properties making them especially useful as temporary adhesives.

More particularly, the hot melt adhesive composition of this invention comprises:

a) about 5 to 50% by weight of a polymer selected from the group consisting of:

i) an isotatic thermoplastic polybutene-1/ethylene copolymer containing from about 5.5 to 10% by weight ethylene, and ii) low density polyethylene;

b) from about 3 to 65% by weight of a solid benzoate plasticizer;

c) from about 10 to 90% by weight of a tackifier; and d) from about 0 to 2% by weight of an antioxidant.

DETAILED DESCRIPTION OF THE INVENTION

The hot melt adhesive compositions of this invention comprise a compatible blend which contains either an isotactic thermoplastic polybutylene copolymer of polybutene-1 and ethylene or a low density polyethylene polymer along with a selected solid benzoate and tackifier.

The polybutylene copolymers employed herein are copolymerb of polybutene-1 and ethylene wherein the ethylene content varies from about 5.5 to about 10% by weight of the copolymer. The applicable isotactic polybutylenes are relatively rigid while in their plastic form but flow readily upon being heated. Expressing molecular weight in terms of "melt index", the applicable isotactic polybutylenes to be used in the present adhesive should exhibit a melt index in the range of from about 5 to 2000 dg/min and preferably from 400 to 700 dg/min. The latter melt flow values are determined by the method described in ASTM D 1238 and are inversely related to molecular weight, i.e., the lower the melt index, the higher the molecular weight. These copolymers are available from Shell Chemical Company under the Duraflex trademark as Duraflex 8310, 8410, 8510 and 8910, with the 8910 having a melt index of about 700, a grade preferred for use herein. Mixtures of these copolymers may also be used.

The low density ethylene polymers used herein can desirably be obtained from conventional film forming as well as other specialty grades of ethylene polymers having a density of about 0.88 to about 0.94, preferably about 0.89 to about 0.93 g/cc and a melt index, as determined by ASTM-1238, in the range of about 2 to 5000 g/10 minutes, or above, including those which extend into low viscosity values, i.e., about 40 cps at 140° C., and preferably about 20 to 3000 g/10 minutes. These low density ethylene polymers can be prepared by well known high pressure processes, or by lower pressure processes, by copolymerizing ethylenes with $C_3$ and higher alphaolefins. Definitions of low density polyethylenes can be found, for example in U.S. Pat. Nos. 4,076,670; 4,120,916; 4,373,066 and 4,471,086. Typically available polymers of this type includes those provided by USI Chemicals Co., e.g., NA 601-00/04 and by Eastman Chemical Products Inc., e.g. C10 and C18.

The solid benzoate plasticizers are generally derived from benzoic acid and selected alcohols and can be represented by the following formula:

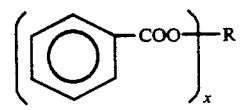

where R is an organic residue and x is 2 to 8 and preferably 2 to 4.

The benzoate plasticizers of the type described above are compatible in the polybutylene adhesive composition and most important help to increase the open time while maintaining high crystallinity, necessary characteristics for the cohesively weak temporary adhesive product desired. These solid benzoates can be prepared from benzoic acid and suitable alcohols such as 1,4-cyclohexane dimethanol, neopentyl glycol, glycerol, pentaerythritol and sucrose. In the benzoate plasticizers, R is an organic residue or radical which is derived from the alcohols used and more particularly will have up to about 12 carbon atoms or more. This organic residue may, for example, be an alkyl, cycloalkyl, aryl, aralkyl, alkenyl or aralkenyl group. Particularly useful benzoate compounds in this invention are those wherein x is 2 to 4 including 1,4-cyclohexane dimethanol dibenzoate, neopentyl glycol dibenzoate, glycerol tribenzoate and pantaerythritol tetrabenzoate. Compounds of this type are available from Velsicol Chemical Corporation under the name Benzoflex.

The tackifying resins which may be used to extend the adhesive properties of the isotactic polybutylene or low density polyethylene include: (1) hydrogenated wood robin or rosin ester; (2) polyterpene resins having a softening point, as determined by an ASTM method E28-58 T, of from about 80° C.–150° C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatac resins sold by Arizona, and the Piccolyte S-85, S-100, S-115, S-125 and S-135 resins as sold by Hercules Chemical; (3) aliphatic petroleum hydrocarbon resins having a Ball and Ring softening point of from about 80°–160° C., resulting from polymerization of monomers consisting primarily of 5 carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins Bold by the Exxon Chemical Corporation; and (4) partially and fully hydrogenated hydrocarbon resins such as Resin H-130 from Eastman, Escorez 5000 series from Exxon, and Regalrez from Hercules. Minor amounts of tackifying resins having lower softening points, such as Piccolyte S-10, S-25 and S-40, may be added to the formulation without effecting the desired weak cohesive bond strength.

The proportions of components in the hot melt adhesive of this invention will generally comprise from about 5 to 50% by weight of the polybutene-1 and ethylene copolymer or the low density polyethylene, preferably about 10 to 40%, from about 3 to 65% by weight of the solid benzoate plasticizer, preferably about 5 to 30%, and from about 10 to 90% by weight of a tackifier, preferably from about 20 to 80%.

In addition to the main components, an antioxidant or stabilizer may be included in the adhesive composition of this invention. Among the applicable stabilizers or antioxidants utilized herein are included high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxy-benzyl)benzene; pentaerythritol tetrakis-3(3,5-di-tert-butyl-4-hydroxyphenyl)propionate; 4,4'methylenbis (2,6-tert-butylphenol); 4,4'-thiobis (6-tert-butyl-o-cresol); 2,6-di-tertbutylphenol; 6-(4-hydroxyphenoxy)-2,4-bis(n-octylthio)-1,3,5-triazine; di-n-octadecyl 3,5-di-tertbutyl-4-hydroxy-benzylphosphonate; 2-(n-octylthio)ethyl 3,5-di-tert-butyl-4-hydroxybenzoate; and sorbitol hexa[3-(3,5-di-tert-butyl-4-hydroxyphenyl)propionate).

The performance of these antioxidants may be further enhanced by utilizing, in conjunction therewith known synergists such, for example, as thiodipropionate esters and phosphites. Particularly useful is distearylthiodipropionate. These stabilizers are generally present in amounts of about up to 2 weight percent, preferably 0.25 to 1.0%.

Other additives such as flow modifiers, pigments, dyestuffs, etc., which are conventionally added to hot melt adhesives for various property enhancements may also be incorporated in minor amounts into the formulations of the present invention.

The adhesive compositions are prepared by blending the components in the melt at a temperature of about 130°–200° C. until a homogeneous blend is obtained, approximately 2 hours. Various methods of blending are known in the art and any method that produces a homogeneous blend is satisfactory.

The resulting adhesives are characterized by a unique combination of properties including an open time of about 0.5 to 2 minutes or more, a delayed crystallinity but one that becomes more crystalline over time and a viscosity of about 200 to 2000 and preferably about 700 to 1500 cps at 350° F. (177° C.). These properties are particularly suitable for applications wherein a temporary break away adhesive is needed and provides a bond that cracks cohesively and shatters in a non-destructive manner when subjected to peel. The cured adhesive bond is extremely resistant to shear. Such an application is involved in palletizing where articles are stored on pallets using an adhesive to keep them temporarily in place until removed by customers and other users.

The following examples will further illustrate the embodiments of this invention. In these examples all parts are given by weight unless otherwise noted.

EXAMPLE I

This example illustrates the preparation of a hot melt adhesive composition in accordance with this invention.

A kettle which had been heated to 150° C. and which was equipped with a stirring paddle was charged with 20 parts of polybutylene (Duraflex 8910, Shell), ten parts of 1,4-cyclohexane dimethanol dibenzoate plasticizer (Benzoflex 352) and 70 parts of Wingtac 95, an aliphatic hydrocarbon tackifier having a softening point of 95° C. Then 0.3 parts of Irganox 1010, a hindered polyphenol antioxidant product of Ciba Geigy and 0.25 parts of Weston TNPP, a phosphite stabilizer product of GE Chemicals was added. The mixture was heated and stirred until all components were melted and a homogeneous melt was obtained.

The homogeneous hot melt composition described above (designated Adhesive A) had a viscosity of 1175 centipoise (cps) at 350° F. as determined by a Brookfield viscometer using a number 27 spindle at 20 r.p.m.

Additional formulations, designated Adhesives B-D were also prepared using the procedure described above and are shown in Table 1.

TABLE 1

| Adhesive Components | Adhesive Sample | | | |
|---|---|---|---|---|
| | A | B | C | D |
| Polybutylene (Duraflex 8910, Shell Chemical) | 20 | 20 | 20 | |
| low density polyethylene (USI NA 601-00/04) | | | | 20 |
| 1,4-cyclohexane dimethanol dibenzoate (Benzoflex 352) | 10 | | | 10 |
| glycerol tribenzoate (Benzoflex S404) | | 10 | | |
| pentaerythritol tetrabenzoate (Benzoflex S 552) | | | 10 | |
| tackifier (aliphatic hydrocarbon) | 70 | 70 | 70 | 70 |
| hindered polyphenol antioxidant | 0.3 | 0.3 | 0.3 | 0.3 |
| phosphite stabilizer | 0.25 | 0.25 | 0.25 | 0.25 |

The resultant adhesive formulations were subjected to various tests using the procedures described below. The results are shown in Table 2.

TEST PROCEDURES

Melt viscosities of the hot melt adhesives were determined at 350° F. on a Brookfield Model RVT thermoset viscometer using a number 27 spindle at 20 r.p.m.

Oven time test was performed by applying (extrusion) the adhesive to 2"×3" strips of corrugated cardboard box and allowing the adhesive to be exposed to air for increasing time increments before a second corrugated cardboard strip was placed on the extruded adhesive. The open time is recorded as the maximum length of time the adhesive may be exposed to air and still produce a useable bond.

Palletizing adhesive test was performed by applying the adhesive to a corrugated strip as disclosed in the open time test above and then placing another corrugated strip on top of the tackifying adhesive to form a bond. This bond was checked periodically over several hours to determine the nature of the bond. A cohesively failing bond is one which separates and does not destroy the substrate while a fiber tearing bond is one which destroys the substrates bonded upon separation.

TABLE 2

| Test | Adhesive Sample | | | |
|---|---|---|---|---|
| | A | B | C | D |
| Viscosity at 350° F. (cps) | 1185 | 1200 | 930 | 200 |
| Open time | 1.75 min. | 1.75 min. | 1 min. | 1.25 min. |
| Palletizing adhesive test | | | | |
| 5 mins. | cohesive | cohesive | cohesive | cohesive |
| 15 mins. | cohesive | cohesive | cohesive | cohesive |
| 1 hour | cohesive | cohesive | cohesive | cohesive |
| 24 hours | cohesive | cohesive | cohesive | cohesive |

EXAMPLE 2

For comparative purposes, several adhesive formulations containing either a different plasticizer than the benzoate or a different polymer than the polybutylene or low density ethylene as found in the adhesives of this invention were tested for palletizing adhesion (adhesion to corrugated strip). The formulations and results are shown below in Table 3.

TABLE 3

| Components | Samples | | | | | |
|---|---|---|---|---|---|---|
| | E | F | C-1 | C-2 | C-3 | C-4 |
| Adhesive | | | | | | |
| Polybutylene (Duraflex 8910) | 20 | — | 20 | — | — | — |
| Tackifier (aliphatic hydrocarbon) | 70 | 70 | 70 | 70 | 70 | 70 |
| 1,4-cyclohexane dimethanol (Benzoflex 352) | 10 | 10 | — | 10 | 10 | 10 |
| hindered polyphenol antioxidant | 0.3 | 0.3 | 0.3 | 0.3 | 0.3 | 0.3 |
| phosphite stabilizer | 0.25 | 0.25 | 0.25 | 0.25 | 0.25 | 0.25 |
| low density polyethylene | — | 20 | — | — | — | — |
| phthalate plasticizer | — | — | 10 | — | — | — |
| amorphous polyalpha olefin | — | — | — | 20 | — | — |
| ethylene vinyl acetate-1 (28% by wt. vinyl acetate) | — | — | — | — | 20 | — |
| ethylene vinyl acetate-2 (18% by wt. vinyl acetate) | — | — | — | — | — | 20 |
| Test | | | | | | |
| Adhesion to Corrugated Strip | cohesive failure | cohesive failure | fiber tear | fiber tear | fiber tear | fiber tear |

The above results show that the adhesive formulations of this invention (E and F) form a bond which cohesively failed when torn or peeled apart indicating a high degree of crystallinity and weak cohesive strength as compared with the comparative adhesive of different formulations which all showed fiber tear, an undesirable type bond where the ripped substrate had part of the corrugated bond attached.

What is claimed is:

1. A hot melt adhesive composition having long open time and delayed but increasing crystallinity comprising:
    a) from about 5 to 50% by weight of a polymer selected from the group consisting of:
        i) an isotatic thermoplastic polybutene-1/ethylene copolymer containing from 5.5 to 10% by weight of ethylene, and
        ii) low density polyethylene;
    b) from about 3 to 65% by weight of a solid benzoate plasticizer having the formula:

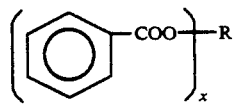

where R is an organic residue and x is 2 to 8;
    c) from about 20 to 90% by weight of a tackifer; and
    d) from about 0 to 2% by weight of an antioxidant.

2. The adhesive of claim 1 wherein isotactic polybutene-1/ethylene copolymer is used in the adhesive and has a melt index of 5 to 2000 dg/min.

3. The adhesive of claim 2 wherein x in the benzoate plasticizer is 2 to 4.

4. The adhesive of claim 3 wherein the benzoate is selected from the group consisting of 1,4-cyclohexane dimethanol dibenzoate, neopentyl glycol dibenzoate, glycerol tribenzoate and pentaerythritol tetrabenzoate.

5. The adhesive of claim 3 wherein the tackifying resin used in the adhesive is selected from the group consisting of hydrogenated wood rosin or rosin ester; polyterpene resins having a softening point of 80°–150° C.; aliphatic petroleum hydrocarbons having a Ball and Ring softening point of 80°–160° C.; and hydrogenated hydrocarbon resins.

6. The adhesive of claim 5 wherein the tackifying resin is a hydrogenated hydrocarbon resin.

7. The adhesive of claim 1 wherein from about 10 to 40% by weight of the copolymer a) is used.

8. The adhesive of claim 7 wherein from about 5 to 30% by weight of solid benzoate plasticizer is used.

9. The adhesive of claim 8 wherein about 20 to 80% by weight of tackifier is used.

10. The adhesive of claim 8 wherein isotactic polybutene-1/ethylene copolymer is used in the adhesive and has a melt index of 5 to 2000 dg/min.

11. The adhesive of claim 10 wherein x in the benzoate plasticizer is 2 to 4.

12. The adhesive of claim 11 wherein the benzoate plasticizer is selected from the group consisting of 1,4-cyclohexane dimethanol dibenzoate, neopentyl glycol dibenzoate, glycerol tribenzoate and pentaerythritol tetrabenzoate.

13. The adhesive of claim 12 wherein the tackifying resin used in the adhesive is selected from the group consisting of hydrogenated wood rosin or rosin ester; polyterpene resins having a softening point of 80°–150° C., aliphatic petroleum hydrocarbons having a Ball and Ring softening point of 80°–160° C., and hydrogenated hydrocarbon resins.

14. In the method of palletizing articles wherein articles are placed or stacked and are temporally held in place using a hot melt adhesive, the improvement wherein the adhesive of claim 1 is used as the hot melt adhesive and provides a non-destructive, cohesive falling break away bond.

15. The method of claim 14 wherein the adhesive of claim 3 is used as the hot melt adhesive.

16. The method of claim 14 wherein the adhesive of claim 4 is used as the hot melt adhesive.

17. The method of claim 14 wherein the adhesive of claim 9 is used as the hot melt adhesive.

18. The method of claim 14 wherein the adhesive of claim 11 is used as the hot melt adhesive.

19. The method of claim 14 wherein the adhesive of claim 12 is used as the hot melt adhesive.

* * * * *